Dec. 6, 1932.    R. R. CROCKER    1,889,776
TIRE COVER
Filed March 7, 1932    2 Sheets-Sheet 1
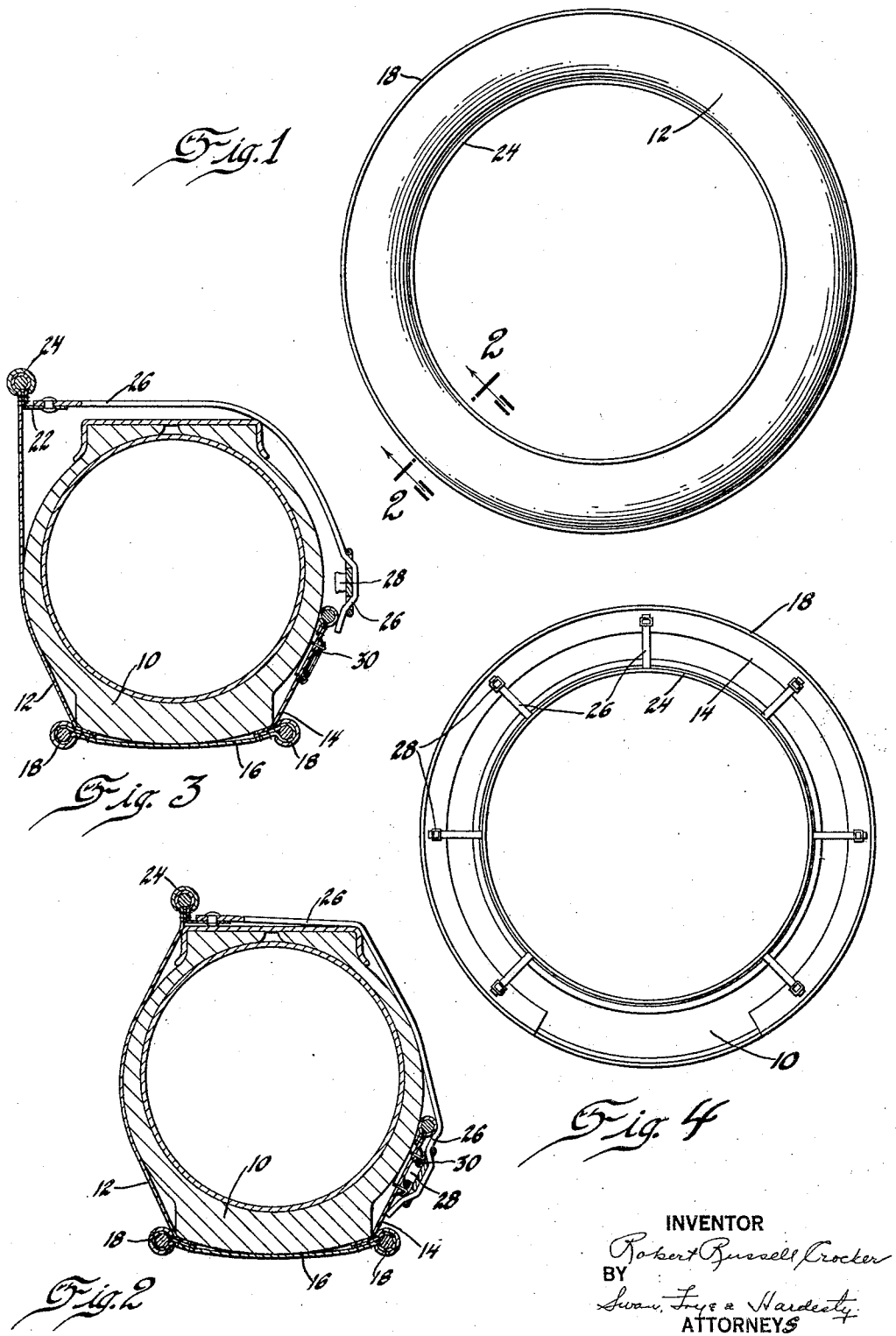

Dec. 6, 1932.  R. R. CROCKER  1,889,776
TIRE COVER
Filed March 7, 1932   2 Sheets-Sheet 2

INVENTOR
Robert Russell Crocker
BY
Swan, Frye & Hardesty
ATTORNEY

Patented Dec. 6, 1932

1,889,776

UNITED STATES PATENT OFFICE

ROBERT RUSSELL CROCKER, OF DEARBORN, MICHIGAN, ASSIGNOR TO THOMAS J. McCORMICK, OF DETROIT, MICHIGAN

TIRE COVER

Application filed March 7, 1932. Serial No. 597,267.

This invention relates to tire covers.

An object of the invention is a ring type tire cover which, though made of a fabric-like material, may be contoured to be form fitting on the tire, in such a manner as to closely resemble metal covers which are generally form fitting.

A still further object is a cover having an annular face piece, and a combined head and back piece between 180° and 360° in length, the back piece covering the back of the tire, all the way down to the rim.

Still further objects will readily occur to those skilled in the art upon reference to the following description and the accompanying drawings in which Figure 1 is a front face view of the tire cover in place on a tire;

Fig. 2 is a section on the line 2—2 thereof;

Fig. 3 is a similar section but with straps shown loose;

Fig. 4 is a rear face view of the tire cover in place on a tire;

Figure 5:
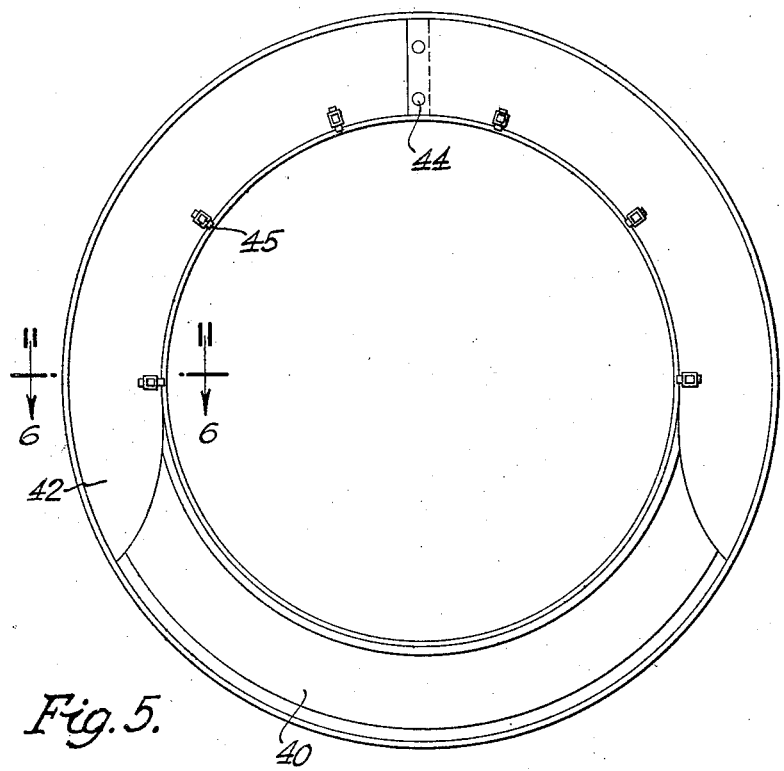
Fig. 5 is a back view of a modification.

Referring to the drawings, it will be seen that there is mounted on the tire 10 a cover comprising an annular front face strip 12, an arcuate rear face strip 14 and an arcuate tread strip 16, the latter and the rear face strip being preferably more than 180 and less than 360 degrees in length and preferably being of the same length. The various sections 12, 14, and 16 may be sewed to each other along annular lines and the joints between may be covered by stiffening and ornamenting moldings indicated at 18.

The construction thus far described forms no part of the present invention being merely indicative of a form of tire cover, known before the date of this invention, and chosen as an embodiment upon which the invention is to be illustrated.

Joined to the inner annular or free edge of the front face strip 12 is a flange 22 which extends towards the rear of the cover and is concealed by the stiffening and ornamenting molding 24 of the front face strip. Riveted or otherwise joined to the flange 22 at spaced points around the cover are straps 26 which at their free ends have adjustably positioned fastening buttons 28 adapted to engage cooperating fasteners 30 on the rear face strip 14.

When the straps are drawn, as in Fig. 2, and the portions 28 and 30 are in cooperative engagement, the front face strip 12 will be drawn tight against the tire 10 so as to be form fitting with respect thereto, and at the same time all puckers, wrinkles, etc. in the tire cover will be pulled out due to the pull of the straps 26. The appearance thus given to the cover is in marked contrast to the appearance thus given to a cover which is not provided with straps. In the latter case, the front face ring 12 will not fit snugly against the tire but will be spaced therefrom at various portions, substantially as shown in Figure 3.

It will also tend to have puckers, wrinkles, etc. marring its appearance.

A cover which is not form fitting, even though made of a smooth glazed fabric, simulating highly polished or enameled metal, will not be as close an imitation of a metal cover as one having the contour of Figure 2. For this reason the cover disclosed is a far more attractive cover than fabric covers of the prior art.

It will be observed, that in making the cover, the straps 26 may be secured to the flange 22 before or after the ring 12 is joined to the tread strip 18, as desired.

Further, while the means for drawing the face ring 12 against the tire is shown as composed of straps, it will be seen that other means, such as ties, laces, resilient connectors, etc. may be provided, without departing from the spirit of the invention.

Further, it will be seen that the molding 24 serves to ornament and stiffen the inner edge of the ring 12, and also serves to conceal the flange 22 and the straps 26.

Figure 6:
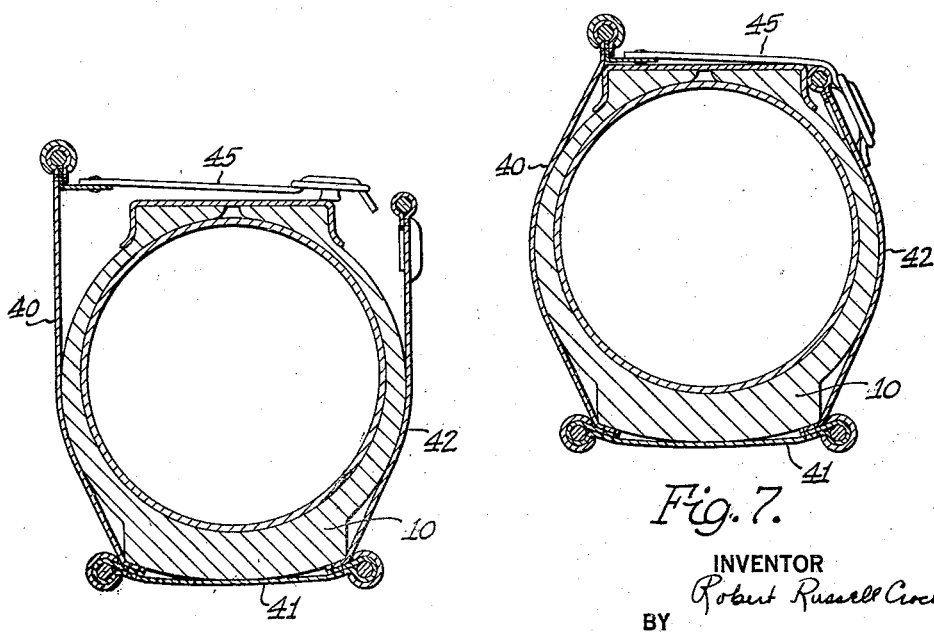
Fig. 6 is a cross section on line 6—6, Figure 5.
Figure 7:
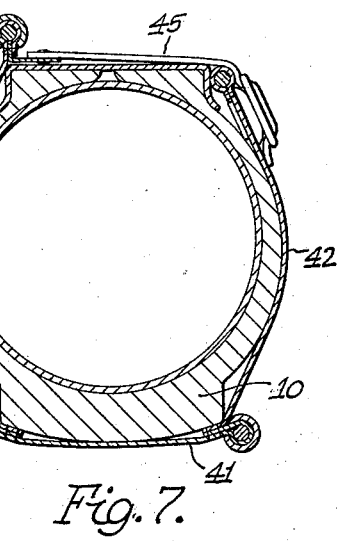
Fig. 7 is a similar view, but with straps drawn and buttoned.

In Figs. 5-7 is shown a cover having an annular face piece 40, a tread section 41 and a rear section 42, these latter two being coextensive and also being between 180° and 360° in length. The back section is not shown as cut on a radial line, but is tapered off as shown. Further, the back section may be split, as shown, the ends being buttoned by fasteners 44. Further, the back section covers the back of the tire all the way down to the rim, giving the appearance of a complete back cover, especially when viewed from the top, as would be the case were the tire mounted in a fender well.

Suitable straps 45 are provided, and these may be similar, in construction and mounting, to those at 26, Figures 1-4.

Further, the stiffening at the inner edge of the face ring, prevents the straps from causing puckering and deflections to appear in the face, around the tire, due to the pull of the straps.

Now having described the invention and the preferred embodiment thereof, it is to be understood that the said invention is to be limited, not to the specific details herein set forth, but only by the scope of the claims which follow:

What I claim is:

1. A tire cover comprising separated face portions joined on their outer edges to and by a tread portion, at least one of the face portions being of a pliable material and also having a completely annular inner edge, and means connecting the inner edges of the face portions to each other and of such a length as to pull the pliable face portion snugly against the tire so as to be form fitting with respect to the latter, the inner annular edge of the pliable face portion being provided with a stiffening or reinforcing means whose rigidity is sufficient to prevent radial puckering of the pliable face, due to the tension exerted by the connecting means.

2. A tire cover comprising separated face portions joined on their outer edges to and by a tread portion, at least one of the face portions being of a pliable material and also having a completely annular inner edge, and means connecting the inner edges of the face portions to each other and of such a length as to pull the pliable face portion snugly against the tire so as to be form fitting with respect to the latter, the inner annular edge of the pliable face portion being provided with a stiffening or reinforcing means whose rigidity is sufficient to prevent radial puckering of the pliable face, due to the tension exerted by the connecting means, the reinforcing means comprising a channel shaped metal molding embracing the inner edge of the pliable face and concealing the connecting means from view.

3. A tire cover comprising separated face portions joined on their outer edges to and by a tread portion, at least one of the face portions being of a pliable material and also having a completely annular inner edge, and means connecting the inner edges of the face portions to each other and of such a length as to pull the pliable face portion snugly against the tire so as to be form fitting with respect to the latter, the inner annular edge of the pliable face portion being provided with a stiffening or reinforcing means whose rigidity is sufficient to prevent radial puckering of the pliable face, due to the tension exerted by the connecting means, the pliable face portion being of a smoothly glazed, metal imitating, fabric-like material.

4. A tire cover comprising separated face portions joined on their outer edges to and by a tread portion, at least one of the face portions being of a pliable material and also having a completely annular inner edge, and means connecting the inner edges of the face portions to each other and of such a length as to pull the pliable face portion snugly against the tire so as to be form fitting with respect to the latter, the inner annular edge of the pliable face portion being provided with a stiffening or reinforcing means whose rigidity is sufficient to prevent radial puckering of the pliable face, due to the tension exerted by the connecting means, the pliable face portion being of a smoothly glazed, metal imitating, fabric-like material, the reinforcing means comprising a channel shaped metal molding embracing the inner edge of the pliable face and concealing the connecting means from view.

5. A tire cover including a face portion of pliable material and having a completely annular inner edge, and a tread portion, means for biasing the face portion snugly against the tire so as to cause the face portion to be form fitting with respect thereto, the inner annular edge of the face portion being provided with a stiffening or reinforcing means whose rigidity is sufficient to prevent radial puckering of the pliable face, due to the force exerted by the biasing means.

6. A tire cover including a face portion of pliable material and having a completely annular inner edge, and a tread portion, means for biasing the face portion snugly against the tire so as to cause the face portion to be form fitting with respect thereto, the inner annular edge of the face portion being provided with a stiffening or reinforcing means whose rigidity is sufficient to prevent radial puckering of the pliable face, due to the force exerted by the biasing means, the means comprising straps connected to the face portion near the inner edge thereof and extending transversely across the tire.

7. A tire cover including an annular, substantially planar, pliable face portion, circumferentially spaced means biasing an annular zone thereof, located adjacent the annular edge of the tire rim, towards said rim, and annular stiffening means in said zone for stiffening said zone, and for preventing radial puckering of said zone, due to the force exerted thereon by the biasing means.

In testimony whereof I, ROBERT RUSSELL CROCKER, sign this specification.

ROBERT RUSSELL CROCKER.